United States Patent
Whaley et al.

(10) Patent No.: US 10,540,195 B1
(45) Date of Patent: *Jan. 21, 2020

(54) SYNCHRONIZING SETTINGS ASSOCIATED WITH VIRTUAL COMPUTING ENVIRONMENTS

(71) Applicant: OPEN INVENTION NETWORK LLC, Durham, NC (US)

(72) Inventors: John Whaley, Fremont, CA (US); Thomas Joseph Purtell, II, Menlo Park, CA (US); Geoffrey G. Thomas, San Francisco, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/784,149

(22) Filed: Oct. 15, 2017

Related U.S. Application Data

(63) Continuation of application No. 13/725,604, filed on Dec. 21, 2012, now Pat. No. 9,792,134.

(51) Int. Cl.
 *G06F 9/44* (2018.01)
 *G06F 9/455* (2018.01)
 *G06F 9/445* (2018.01)

(52) U.S. Cl.
 CPC ...... *G06F 9/45533* (2013.01); *G06F 9/44505* (2013.01)

(58) Field of Classification Search
 CPC .................. G06F 9/45533; G06F 9/44505
 See application file for complete search history.

(56) References Cited

U.S. PATENT DOCUMENTS

| | | | | |
|---|---|---|---|---|
| 6,681,267 B2* | 1/2004 | Ohmura | .................... | G06F 9/50 710/5 |
| 8,892,919 B2* | 11/2014 | Khodorkovsky | ......... | G06F 3/14 713/320 |
| 2007/0074063 A1* | 3/2007 | Mondshine | ........... | G06F 9/4406 714/4.4 |
| 2009/0170472 A1* | 7/2009 | Chapin | ................. | H04W 28/18 455/410 |
| 2010/0218184 A1* | 8/2010 | Minematsu | ............. | G06F 9/544 718/1 |

* cited by examiner

*Primary Examiner* — Stefan Stoynov

(57) ABSTRACT

The disclosed embodiments provide a system that operates a computer system. During operation, the system detects a first change in a setting associated with a first computing environment executing on the computer system, wherein the first change is associated with at least one of an input/output (I/O) device setting, a regional setting, a network setting, a power setting, and a display setting. Next, the system propagates the first change to one or more other computing environments executing on the computer system.

20 Claims, 4 Drawing Sheets

SYNCHRONIZING SETTINGS ASSOCIATED WITH VIRTUAL COMPUTING ENVIRONMENTS

RELATED APPLICATIONS

The present patent application is a continuation of patent application Ser. No. 13/725,604, filed Dec. 21, 2012, now issued U.S. Pat. No. 9,792,134, issued on Oct. 17, 2017, which is related to the subject matter in a non-provisional application by inventors John Whaley and Thomas Joseph Purtell II, entitled "Interception and Management of I/O Operations on Portable Storage Devices," having Ser. No. 12/435,273 and filing date May 4, 2009 now U.S. Pat. No. 8,578,064, issued on Nov. 5, 2013, and to the subject matter in a non-provisional application by inventors Thomas Joseph Purtell II and John Whaley, entitled "Policy-Based Layered Filesystem Management," having Ser. No. 12/435,279 and filing date May 4, 2019, now U.S. Pat. No. 9,805,041, issued on Oct. 31, 2017.

BACKGROUND

Field

The disclosed embodiments relate to techniques for facilitating the execution of virtual computing environments in computer systems. More specifically, the disclosed embodiments relate to techniques for synchronizing settings associated with virtual computing environments executing on a computer system.

Related Art

Virtual machines may be used to extend the functionality and portability of computing environments. For example, a virtual machine containing a guest operating system may be executed from any computer with a compatible hypervisor for the virtual machine. The self-contained nature of the virtual machine may also facilitate the efficient copying and transfer of the virtual machine between multiple devices, including personal computers, servers, and portable storage devices.

Ease of deployment and portability may further be facilitated through the central management and local execution of virtual machines. An example of a central management solution for locally executed virtual machines may include the MokaFive Server, Player and Creator products offered by MokaFive (moka5, Inc., a Delaware corporation). In particular, a virtual machine may be centrally defined and managed using the MokaFive Server. Any computer containing the MokaFive Player may then download an image of the virtual machine from the MokaFive Server and run the virtual machine within the MokaFive Player. Changes made to the virtual machine from the computer may be backed up on the MokaFive Server so that subsequent execution of the virtual machine from other computers may include the changes. Similarly, updates to the virtual machine may be administered by the MokaFive Server and automatically included in the virtual machine image so that subsequent use of the virtual machine includes the updates.

However, changes to settings associated with a particular virtual machine may not be applied to other virtual machines on the same computer system. For example, a change to the time zone and/or default language of a Windows (Windows™ is a registered trademark of Microsoft Corp.) virtual machine may not affect the time zones and/or default languages of a Linux (Linux™ is a registered trademark of Linus Torvalds) virtual machine and/or a host operating system on the computer system. Instead, a user of the computer system may be required to manually update the time zone and/or default language settings on the other virtual machines and/or host operating system to maintain uniformity in the settings across the virtual machines and/or host operating system. Moreover, such manual updating of settings across virtual machines may be tedious, confusing, and/or error-prone.

Hence, use of multiple virtual machines and/or operating systems on a computer system may be facilitated by automatically synchronizing settings across the virtual machines and/or operating systems.

SUMMARY

The disclosed embodiments provide a system that operates a computer system. During operation, the system detects a first change in a setting associated with a first computing environment executing on the computer system, wherein the first change is associated with at least one of an input/output (I/O) device setting, a regional setting, a network setting, a power setting, and a display setting. Next, the system propagates the first change to one or more other computing environments executing on the computer system.

In some embodiments, the computing environment and the one or more other computing environments include at least one of a guest operating system, a hypervisor, and a host operating system.

In some embodiments, the system also resolves a conflict between the first change and a second change in the setting from a second computing environment from the one or more other computing environments.

In some embodiments, resolving the conflict between the first change and the second change in the setting involves selecting a change in the setting from the first change and the second change, and propagating the selected change among the first computing environment and the one or more other computing environments.

In some embodiments, the change is selected based on at least one of:
  (i) a set of priorities associated with the first and second computing environments;
  (ii) an order associated with the first and second changes; and
  (iii) a policy associated with the first and second computing environments.

In some embodiments, the first change is detected using at least one of a shim, a driver, a system call interposition, a listener, and a polling technique.

In some embodiments, propagating the first change to the one or more other computing environments involves converting the first change into a canonical form, and providing the canonical form to the one or more other computing environments.

In some embodiments, the first change is applied immediately or saved for subsequent application by the one or more other computing environments.

In some embodiments, the first change is converted into the canonical form based on a policy associated with at least one of the first computing environment and the one or more other computing environments.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices. When the hardware modules or apparatus are activated, they perform the methods and processes included within them.

Figure 1:
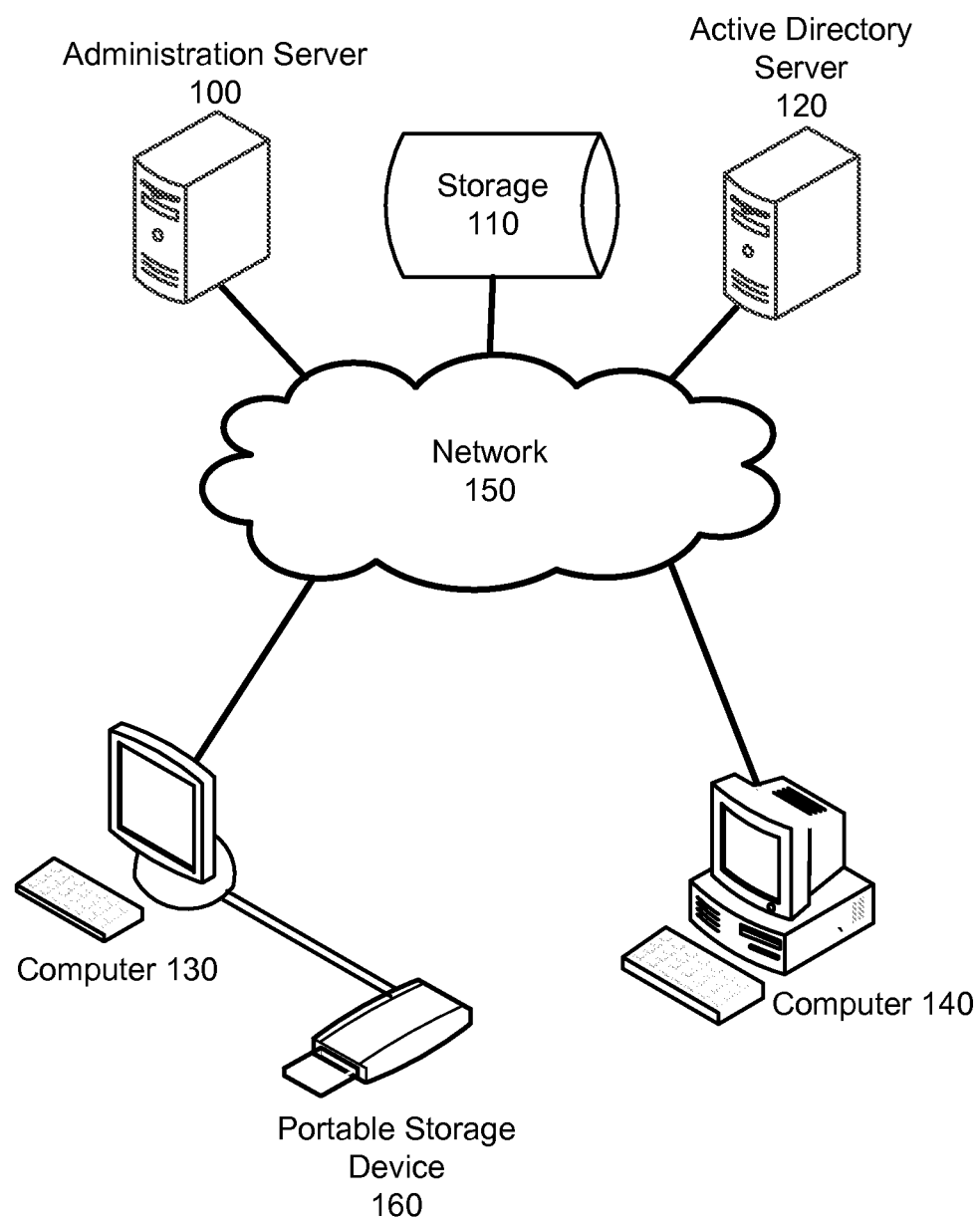
FIG. 1 shows a schematic of a system in accordance with the disclosed embodiments.

FIG. 1 shows a schematic of a system in accordance with an embodiment. As shown in FIG. 1, the system includes an administration server 100, storage 110, an active directory server 120, a set of computers 130-140, a network 150, and a portable storage device 160. Each of the components is described in further detail below.

Computers 130-140 may correspond to electronic devices that may be used to perform tasks for users of computers 130-140. For example, each computer 130-140 may correspond to a personal computer (PC), laptop computer, and/or workstation. Network 150 may correspond to a computer network, such as a local area network (LAN), wide area network (WAN), wireless network, intranet, internet, and/or another type of network that facilitates communication among devices (e.g., administration server 100, storage 110, active directory server 120, computers 130-140) connected to network 150. For example, computers 130-140 may operate as clients in network 150 and allow users of computers 130-140 to send and receive emails, retrieve web pages, and/or send and receive files with other computers and/or servers (e.g., administration server 100, active directory server 120) on network 150.

Computers 130-140 may serve as host computing resources and environments for guest virtual computing environments. In one or more embodiments, the virtual computing environments correspond to virtual machines that execute operating systems locally on computers 130-140, but in isolation from other virtual machines and host computing environments (e.g., native operating systems) on computers 130-140. The virtual computing environments may also provide other types of virtualization to users of computers 130-140, such as application virtualization and/or resource (e.g., network, memory, storage, processor, etc.) virtualization. For example, computer 130 may include three virtual computing environments respectively running Linux, Mac OS X (OS X™ is a registered trademark of Apple Inc.), and Microsoft Windows (Microsoft Windows™ is a registered trademark of Microsoft Corp.). Applications and/or processes that are specific to an operating system may thus run on computers 130-140 within the virtual computing environment containing the operating system. In other words, the execution of one or more virtual computing environments on computers 130-140 may provide increased versatility, utilization of resources, and/or security to computers 130-140. Software such as VMware Workstation (Windows), VMware Fusion (Mac) (VMware Fusion™ is a registered trademark of VMware, Inc.), Parallels, and VirtualBox (VirtualBox™ is a registered trademark of Oracle America, Inc.) may be used to provide these capabilities.

In one or more embodiments, the system of FIG. 1 enables the central management and local execution of virtual computing environments. Such central management and local execution may allow the virtual computing environments to be configured from a central location and efficiently deployed to multiple users from the central location. Moreover, changes and updates to the virtual computing environments may be automatically propagated to the users from the central location, resulting in significant savings in time and resources. An example of a central management solution for locally executed virtual computing environments may include the MokaFive Server, Player and Creator products offered by MokaFive (moka5, Inc., a Delaware corporation). In particular, the MokaFive Player may be used with computers 130-140 to locally execute a centrally defined and managed virtual computing environment according to rules and access controls defined in the MokaFive Server.

Administration server 100 may be a server that supports centralized definition of virtual computing environments and management of access and permissions to the same for local execution. For example, administration server 100 may be provided by the MokaFive Server. Administration server 100 may itself execute in a virtual computing environment, such as a VMware ESX environment. An administrator of virtual computing environments for computers 130-140 may create, configure, and delete the virtual computing environments by interacting with administration server 100 through a management interface (e.g., graphical user interface (GUI), web-based user interface, etc.) provided by administration server 100.

Active directory server 120 may provide network-based directory services. For example, active directory server 120 may be a Microsoft Active Directory (Active Directory™ is a registered trademark of Microsoft Corp.) Domain Controller, OpenLDAP server, OpenID, and/or another commercially available directory server. More specifically, active directory server 120 may store, organize, and provide access to users, groups, and permissions associated with virtual computing environments managed through administration server 100. For example, active directory server 120 may enable a hierarchical framework of services (e.g., virtual computing environments) and users (e.g., user accounts and groups) within network 150 to be used by administration server 100 in defining access permissions and policies to virtual computing environments.

In one or more embodiments, virtual computing environments executed on computers 130-140 are stored in storage 110. Storage 110 may correspond to network attached storage (NAS), a web server with attached storage, a storage area network (SAN), and/or another storage mechanism that is accessible through network 150. Computers 130-140 may obtain the virtual computing environments from storage 110 through network 150 and execute the virtual computing environments locally to enable users of computers 130-140 to interact with the virtual computing environments.

To access the virtual computing environments, each computer 130-140 may include one or more subscriptions to virtual computing environments stored in storage 110. Each subscription may identify administration server 100 and a specific virtual computing environment provided by administration server 100. To execute the virtual computing environment, a user of the computer may provide authentication credentials for the virtual computing environment to administration server 100, which may relay the authentication credentials to the active directory server 120 as necessary. If the user is authorized to use the virtual computing environment, the virtual computing environment is downloaded from storage 110 over network 150 and loaded on the computer for use by the user.

Furthermore, virtual computing environments executing on computers 130-140 may be stored on and/or loaded from portable storage devices (e.g., portable storage device 160) coupled to computers 130-140, including Universal Serial Bus (USB) flash drives, flash memory cards, and/or portable electronic devices (e.g., mobile phones, portable media players, tablet computers, personal digital assistants, etc.). Portable storage device 160 may also include virtualization software (e.g., hypervisors), subscription information, user data, and/or other information required to load the virtual computing environments into any compatible computer (e.g., x86 computers) without pre-installation of software on the computer.

In other words, the virtual computing environments and all information and software required to execute the virtual computing environments may be loaded, stored, and managed entirely from portable storage device 160 instead of from computers 130-140 and/or network 150. Management of virtual computing environments from portable storage devices is described in a co-pending non-provisional application by inventors John Whaley and Thomas Joseph Purtell II, entitled "Interception and Management of I/O Operations on Portable Storage Devices," having Ser. No. 12/435,273, and filing date 4 May 2009, which is incorporated herein by reference.

In one or more embodiments, virtual computing environments on computers 130-140 are stored in layered filesystems. The layered filesystems may separate different components of the virtual computing environments into individually managed layers based on policies for the layered filesystems. In one or more embodiments, each layered filesystem includes a system layer that stores an image of a virtual computing environment obtained from storage 110 and/or administration server 100. The layered filesystem may also include an application layer for storing user-installed applications, as well as a user data layer for storing user-specific documents and settings.

The layered filesystems may further facilitate the management of the virtual computing environments by enabling individual layers to be added, removed, temporarily disabled, and/or restored. In particular, the system layer may be periodically populated with a new image of the virtual computing environment from storage 110 and/or administration server 100. As a result, computers 130-140 may always execute the most up-to-date versions of the virtual computing environments. Furthermore, the application layer may be removed or temporarily disabled if a virus or malfunctioning application is installed in the application layer. Snapshots or backups of individual layers may additionally enhance the security, reliability, and integrity of the virtual computing environments. Management and execution of virtual computing environments using layered filesystems is described in a co-pending non-provisional application by inventors Thomas Joseph Purtell II and John Whaley, entitled "Policy-Based Layered Filesystem Management," having Ser. No. 12/435,279, and filing date 4 May 2009, which is incorporated herein by reference.

Figure 2:
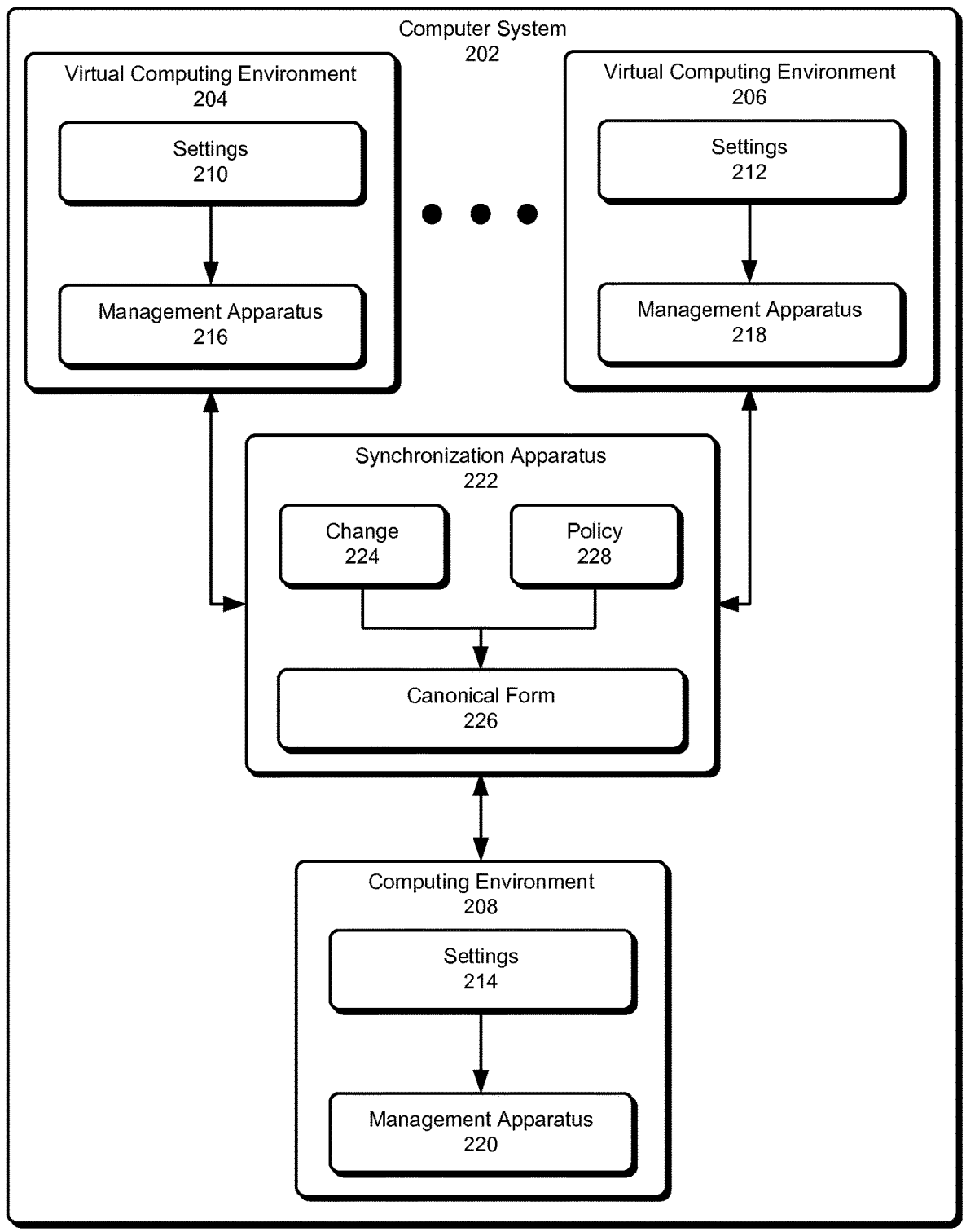
FIG. 2 shows a system for operating a computer system in accordance with the disclosed embodiments.

Those skilled in the art will appreciate that multiple virtual computing environments from network 150 and/or portable storage device 160 may be executed on the same computer system (e.g., computers 130-140). As shown in FIG. 2, a computer system 202 (e.g., personal computer, laptop computer, workstation, tablet computer, etc.) may include a set of virtual computing environments 204-206. As mentioned above, virtual computing environments 204-206 may be virtual machines that support the execution of guest operating systems on computer system 202.

To allocate hardware and/or other resources on computer system 202 among virtual computing environments 204-206, computer system 202 may include a non-virtual computing environment 208 that provides a hypervisor for virtual computing environments 204-206. More specifically, computing environment 208 may be a type I hypervisor that runs directly on hardware in computer system 202, or computing environment 208 may be a host operating system installed on computer system 202 that includes a type II hypervisor. For example, computing environment 208 may be provided by the MokaFive BareMetal platform.

In addition, each virtual and/or non-virtual computing environment 204-208 may include a set of settings 210-214 related to operation and/or use of the computing environment. Settings 210-214 may include input/output (I/O) device settings such as keyboard settings related to keyboard layout, key repeat rate, key repeat delay, cursor blink rate, input language, input dictionary, auto-capitalization, on-screen keyboard, haptic feedback, and/or voice input. The I/O device settings may also include mouse and/or cursor settings related to speed, acceleration, precision, handedness, button assignments, double-click speed, wheel settings, click-lock, cursor trails, hiding the cursor while typing, and/or showing the cursor upon pressing a key. If a touchpad is used in addition to and/or in lieu of a mouse, the I/O device settings may include settings related to sensitivity, tap-to-click, gestures, and/or palm detection.

Settings 210-214 may additionally include regional settings related to the time and/or location of the user and/or computer system 202. For example, settings 210-214 may specify a time zone, a daylight savings time setting, a Network Time Protocol (NTP) server, and/or other time settings. The regional settings may also specify a display language; input method editor (IME) settings; formatting of currency, numbers, and/or time; paper size; and/or other locale settings.

Settings 210-214 may also include network settings. The network settings may include a Domain Name System (DNS) server, static Internet Protocol (IP) address, subnet, proxy server, default gateway, and/or other Transmission Control Protocol (TCP)/IP settings. If computer system 202 includes functionality to communicate wirelessly, the network settings may also specify a set of preferred wireless networks, passwords and/or authentication information for the wireless networks, preferences related to ad hoc wireless connections with other computer systems, and/or cellular network settings.

Furthermore, settings 210-214 may include power settings, particularly if computer system 202 is a laptop computer and/or portable electronic device. The power settings may relate to display brightness, timeout before standby, switching between graphics-processing units (GPU), limiting of central processing unit (CPU) performance, standby and/or hibernate settings, and/or other settings related to power management and/or savings on computer system 202.

Finally, settings 210-214 may include display settings. The display settings may specify a screen resolution, display layout, display orientation, display brightness, display calibration, multi-display settings, and/or other settings related to the display(s) of computer system 202.

Because each computing environment 204-208 is executed in isolation from other computing environments in computer system 202, changes to settings (e.g., settings 210-214) for the computing environment may not be reflected in the settings of the other computing environments. Instead, the user may be required to manually adjust the settings on the other computing environments to maintain uniformity in the settings across the computing environments. However, such manual changing of settings for individual computing environments may be time-consuming, tedious, and/or confusing for the user.

For example, computing environments 204-208 may be associated with different operating systems that provide different user interfaces and/or options for changing settings 210-214. As a result, the user may change a setting in a computing environment by locating a user interface for adjusting settings within the computing environment, navigating within the user interface to a screen related to the setting, and making the appropriate change to the setting within the user interface. To ensure that the change is reflected in other computing environments on computer system 202, the user may repeat the process for the other computing environments, which may consume significant time and/or cause the user to apply the change incorrectly and/or ineffectively within another computing environment.

In one or more embodiments, computer system 202 includes functionality to synchronize changes in settings on one computing environment with other computing environments on computer system 202. In particular, each computing environment 204-208 may include a management apparatus 216-220 that detects a change 224 in a setting associated with the computing environment. To enable such detection, the management apparatus may be implemented using a shim, a driver, a system call interposition, a listener, a polling technique, and/or another mechanism within the corresponding computing environment (e.g., operating system, virtual machine, etc.).

Next, a synchronization apparatus 222 in computer system 202 may propagate change 224 among the computing environments in computer system 202. First, synchronization apparatus 222 may convert change 224 into a canonical form 226. Next, synchronization apparatus 222 may provide canonical form 226 to the other computing environments. Finally, the corresponding management apparatuses in the other computing environments may apply the change immediately and/or save the change for subsequent application (e.g., during execution of the other computing environments). For example, synchronization apparatus 222 may convert change 224 into a call to a standardized interface with management apparatuses 216-220, and management apparatuses 216-220 may receive the call over the interface and use the call to apply change 224 within the corresponding computing environments 204-208. If a computing environment is not currently executing (e.g., suspended, powered off, locked, in maintenance mode, etc.), the corresponding management apparatus may record change 224 in metadata associated with the computing environment and subsequently apply change 224 once the computing environment is running. To record change 224, the management apparatus may manipulate the system layer of a layered filesystem containing the computing environment (e.g., by modifying a configuration file or Windows Registry hive in the system layer).

For example, change 224 may be intercepted by a management apparatus for a guest operating system on computer system 202. To facilitate efficient implementation of change 224, the management apparatus may transmit change 224 to synchronization apparatus 222, which provides a bypass interface between the guest operating system and a host operating system on computer system 202. The bypass interface may convert change 224 into canonical form 226 and transmit canonical form 226 to the host operating system, which uses canonical form 226 to implement change 224 for both the host operating system and guest operating system (e.g., if a resource associated with change 224 is shared between the host and guest operating systems). Bypass interfaces for synchronizing operations between guest and host operating systems are discussed in further detail in U.S. Pat. No. 8,065,687 (issued 22 Nov. 2011), by inventors Thomas Joseph Purtell II, Won Chun and Michael Carbin, entitled "Bypass Virtualization," which is incorporated herein by reference.

In addition, synchronization apparatus 222 may generate canonical form 226 based on a policy 228 associated with computing environments 204-208. In particular, policy 228 may specify use and/or sharing of resources on computer system 202 by computing environments 204-208. As a result, settings 210-214 may be shown, excluded, and/or set in computing environments 204-208 according to policy 228 and change 224. For example, change 224 may specify the selection of a display for use with a computing environment, while policy 228 may lock each computing environment to a particular display. As a result, the selected display may be omitted from the display settings of other computing environments to prevent use of the display with the other computing environments. As another example, policy 228 may restrict network connections from computing environments 204-208 to encrypted wireless networks. In turn, synchronization apparatus 222 and/or management apparatuses 216-220 may provide only encrypted wireless access points in the preferred wireless networks of computing environments 204-208.

Synchronization apparatus 222 may further resolve a conflict between change 224 and another change in the same setting from another computing environment in computer system 202. For example, change 224 may conflict with the other change if both changes are made within a pre-specified period and/or before one of the changes can be propagated across computing environments 204-208. To resolve the conflict, synchronization apparatus 222 may select one of the changes and propagate the selected change among computing environments 204-208 using a canonical form (e.g., canonical form 226) of the change, as described above.

In one or more embodiments, synchronization apparatus 222 resolves the conflict based on a set of priorities associated with computing environments 204-208, an order associated with the changes, and/or policy 228. For example, a change from a host operating system on computer system 202 may override a change from a guest operating system on computer system 202 because the host operating system is associated with a higher priority than the guest operating system. Alternatively, one change may be selected over another change because the selected change occurred more recently than the other change. Finally, policy 228 may specify handling of the conflict so that one or both changes are applied to various subsets of computing environments 204-208 on computer system 202.

By synchronizing and/or propagating changes (e.g., change 224) across computing environments 204-208, the system of FIG. 2 may reduce overhead and/or user error associated with manually applying the same change to settings 210-214 on computing environments 204-208. In addition, policy 228 may ensure that settings 210-214 are changed and/or propagated in a way that reflects an appropriate sharing and/or allocation of resources on computer system 202 among computing environments 204-208.

Those skilled in the art will appreciate that the system of FIG. 2 may be implemented in a variety of ways. As described above, management apparatuses 216-220 may be implemented using a number of techniques, including shims, drivers, system call interposition, listeners, and/or polling techniques. Similarly, synchronization apparatus 222 may be provided by a bypass virtualization technique, driver, hypervisor, and/or host operating system on computer system 202. Alternatively, synchronization apparatus 222 may reside on a server, such as administration server 100 of FIG. 1. As a result, change 224 may be transmitted from the management apparatus (e.g., management apparatuses 216-220) that detected change 224 to the server and propagated from the server to other computing environments on computer system 202 (e.g., by updating the system layers of the computing environments with new images containing change 224).

Figure 3:
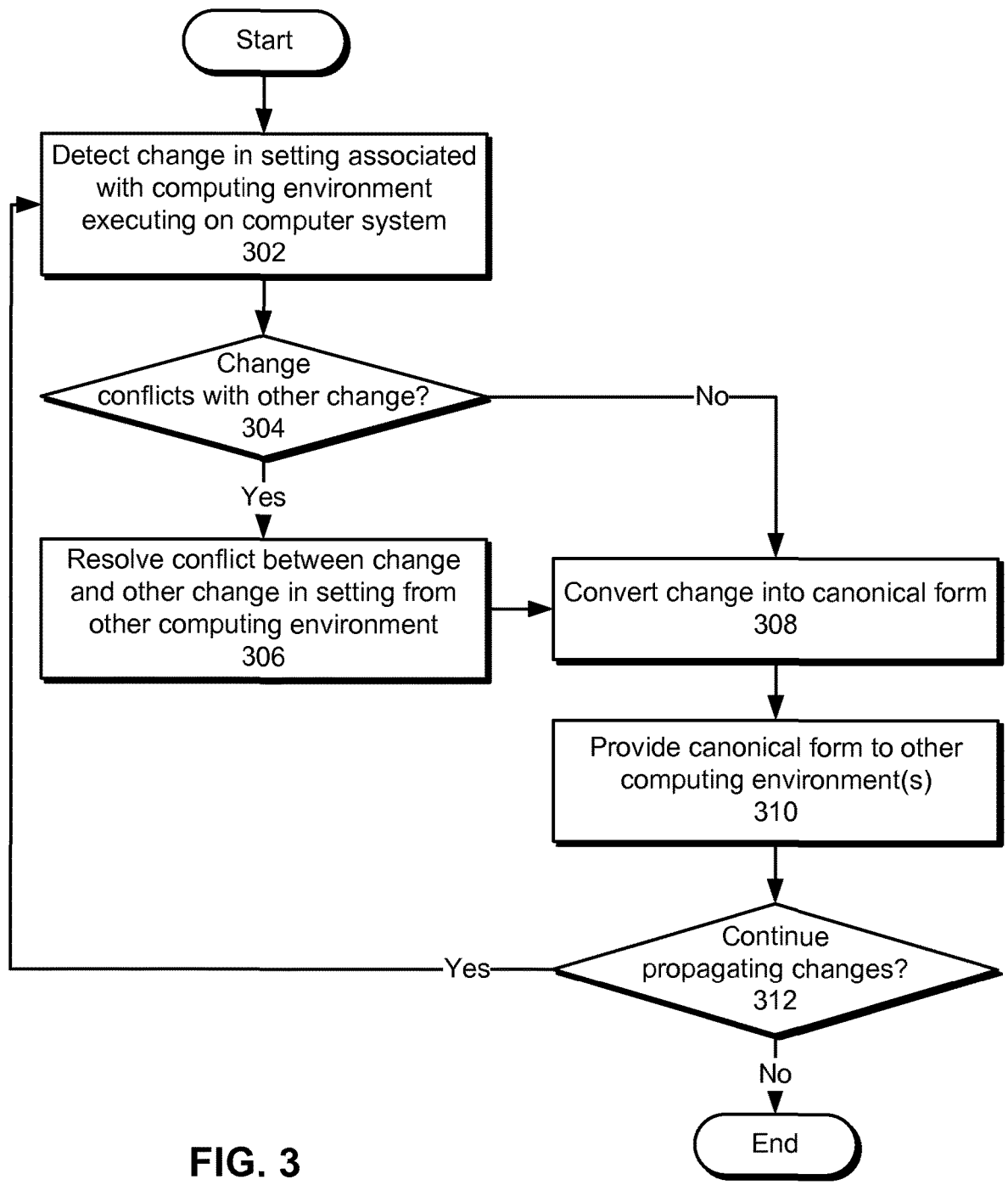
FIG. 3 shows a flowchart illustrating the process of operating a computer system in accordance with the disclosed embodiments.

FIG. 3 shows a flowchart illustrating the process of operating a computer system in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a change in a setting associated with a computing environment executing on the computer system is detected (operation 302). The computing environment may include a guest operating system, a hypervisor, and/or a host operating system. The change may be associated with an I/O device setting, a regional setting, a network setting, a power setting, and/or a display setting. The change may be detected using a shim, a driver, a system call interposition, a listener, and/or a polling technique.

The change may conflict with another change (operation 304) to the setting from another (e.g., second) computing environment on the computer system. For example, a conflict may exist if the changes are both received before the change can be propagated to one or more other computing environments on the computer system. If the changes do not conflict, the change is propagated to one or more other computing environments executing on the system by converting the change into a canonical form (operation 308) and providing the canonical form to the other computing environment(s) (operation 310).

If the changes conflict, the conflict is resolved (operation 306) by selecting a change from one or more of the conflicting changes and propagating the selected change among the computing environments (operations 308-310). The change may be selected and/or propagated based on a set of priorities associated with the computing environments, an order associated with the first and second changes, and/or a policy associated with the computing environments. For example, the selected change may be obtained from a computing environment with a higher priority, made more recently than the other change, and/or excluded from one or more of the other computing environments based on the policy.

The conflicting changes may also be merged into the selected change. For example, two conflicting DNS server entries may be merged by adding both DNS server entries to the network settings of the computing environments. Alternatively, two numeric values for CPU frequency, display timeout, and/or other power settings may be merged by propagating the average of the conflicting values to the computing environments. In other words, resolution of the conflict may be accomplished via a union, intersection, merge, vote, and/or other computation based on the nature and/or semantics of the setting to be changed.

Changes to the settings of one computing environment may continue to be propagated (operation 312) to the other computing environments on the computer system. If such propagation of changes is to continue, a new change in a setting associated with one of the computing environments is obtained (operation 302), any conflict between the change and another change in the setting from another computing environment is resolved (operations 304-306), and the change and/or other change are propagated to the other computing environments (operations 308-310). Propagation and/or synchronization of changes among the computing environments may thus continue until synchronization is disabled and/or the computer system is no longer used with multiple computing environments.

Figure 4:
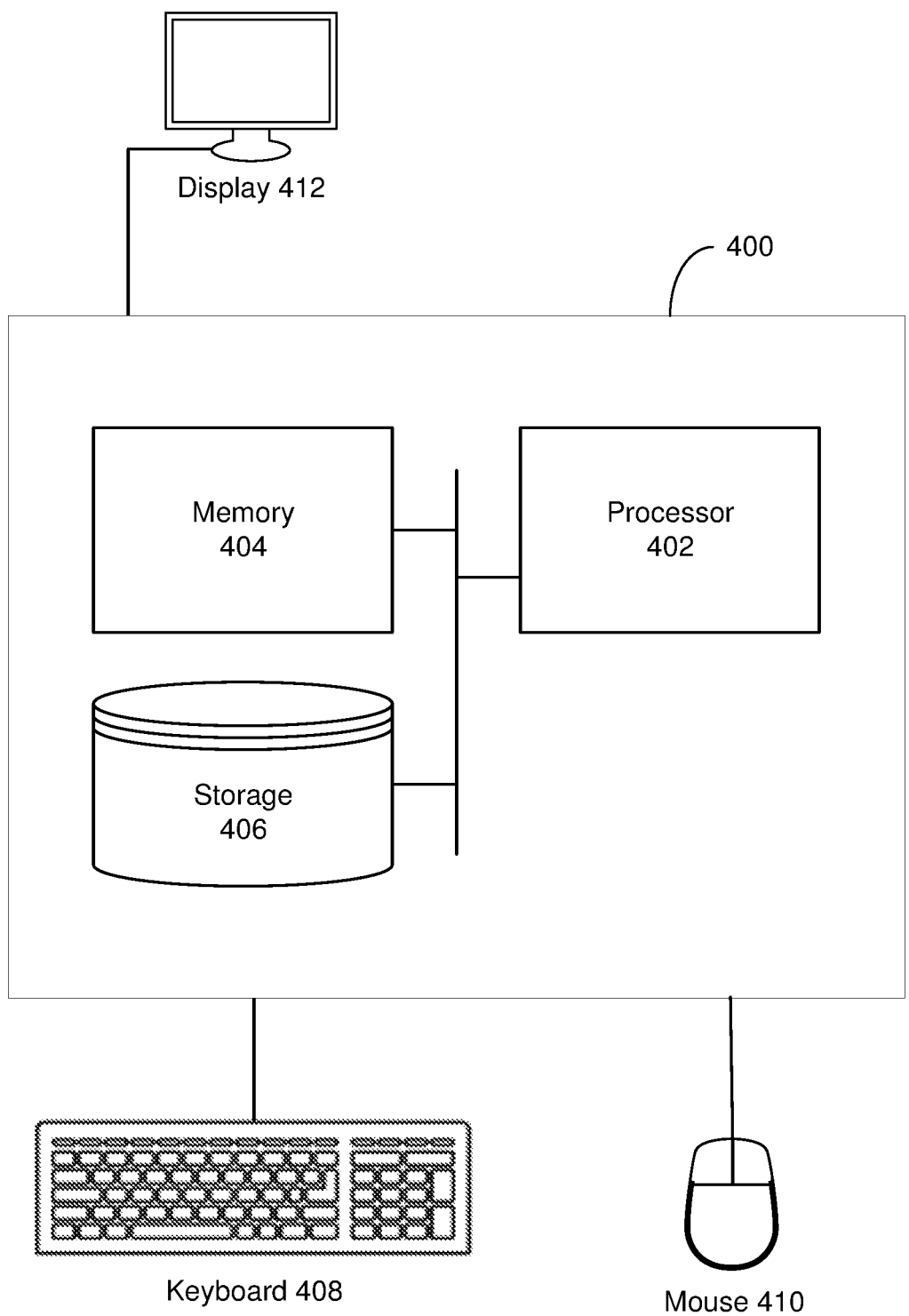
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for operating a computer system. The system may include a management apparatus that detects a first change in a setting associated with a first computing environment executing on the computer system. The first change may be associated with at least one of an input/output (I/O) device setting, a regional setting, a network setting, a power setting, and a display setting. The system may also include a synchronization apparatus that propagates the first change to one or more other computing environments executing on the computer system. The synchronization apparatus may also resolve a conflict between the first change and a second change in the setting from a second computing environment from the one or more other computing environments. To resolve the conflict, the synchronization apparatus may select a change in the setting from the first change and the second change and propagate the selected change among the first computing environment and the one or more other computing environments.

In addition, one or more components of computer system 400 may be remotely located and connected to the other components over a network. Portions of the present embodiments (e.g., management apparatus, synchronization apparatus, etc.) may also be located on different nodes of a distributed system that implements the embodiments. For example, the present embodiments may be implemented using a cloud computing system that synchronizes settings across a set of virtual computing environments executing on one or more remote computer systems.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for operating a computer system, comprising:
   detecting a first change in a setting associated with a first virtual computing environment executing on the computer system, wherein the first change is associated with at least one of an input/output (I/O) device setting, a regional setting, a network setting, a power setting, and a display setting, wherein the first change to the network setting comprises changes to a Domain Name System (DNS) server setting, static Internet Protocol (IP) address setting, and a Transmission Control Protocol (TCP)/IP setting; and
   propagating the first change to one or more other virtual computing environments executing on the computer system from a central location, resulting in a savings in resources.

2. The computer-implemented method of claim 1, wherein the virtual computing environment and the one or more virtual other computing environments comprise at least one of:
   a guest operating system;
   a hypervisor; and
   a host operating system.

3. The computer-implemented method of claim 1, further comprising resolving a conflict between the first change and a second change in the setting from a second virtual computing environment from the one or more other virtual computing environments.

4. The computer-implemented method of claim 3, wherein resolving the conflict between the first change and the second change in the setting involves:
   selecting a change in the setting from at least one of the first change and the second change; and
   propagating the selected change among the first virtual computing environment and the one or more other virtual computing environments.

5. The computer-implemented method of claim 3, wherein the conflict is resolved based on at least one of:
   a set of priorities associated with the first and second virtual computing environments;
   an order associated with the first and second changes; and
   a policy associated with the first and second virtual computing environments.

6. The computer-implemented method of claim 1, wherein the first change is detected using at least one of a shim, a driver, a system call interposition, a listener, and a polling technique.

7. The computer-implemented method of claim 1, wherein propagating the first change to the one or more other virtual computing environments involves:
   converting the first change into a canonical form; and
   providing the canonical form to the one or more other virtual computing environments.

8. The computer-implemented method of claim 7, wherein the first change is converted into the canonical form based on a policy associated with at least one of the first virtual computing environment and the one or more other virtual computing environments.

9. The computer-implemented method of claim 1, wherein the first change is applied immediately or saved for subsequent application by the one or more other virtual computing environments.

10. A system for operating a computer system, comprising:
    a management apparatus configured to detect a first change in a setting associated with a first virtual computing environment that executes on the computer system, wherein the first change is associated with at least one of an input/output (I/O) device setting, a regional setting, a network setting, a power setting, and a display setting, wherein the first change to the network setting comprises changes to a Domain Name System (DNS) server setting, static Internet Protocol (IP) address setting, and a Transmission Control Protocol (TCP)/IP setting; and
    a synchronization apparatus configured to propagate the first change to one or more other virtual computing environments that execute on the computer system from a central location, resulting in a reduction in resources.

11. The system of claim 10, wherein the virtual computing environment and the one or more other virtual computing environments comprise at least one of:
    a guest operating system;
    a hypervisor; and
    a host operating system.

12. The system of claim 10, wherein the synchronization apparatus is further configured to resolve a conflict between the first change and a second change in the setting from a second virtual computing environment from the one or more other virtual computing environments.

13. The system of claim 12, wherein the conflict is resolved based on at least one of:
    a set of priorities associated with the first and second virtual computing environments;
    an order associated with the first and second changes; and a policy associated with the first and second virtual computing environments.

14. The system of claim 10, wherein the first change is detected using at least one of a shim, a driver, a system call interposition, a listener, and a poll technique.

15. The system of claim 10, wherein propagating the first change to the one or more other virtual computing environments involves:
converting the first change into a canonical form; and
providing the canonical form to the one or more other virtual computing environments.

16. A non-transitory computer-readable storage medium storing instructions that when executed by a computer cause the computer to perform a method for operating a computer system, the method comprising:
detecting a first change in a setting associated with a first virtual computing environment executing on the computer system, wherein the first change is associated with at least one of an input/output (I/O) device setting, a regional setting, a network setting, a power setting, and a display setting, wherein the first change to the network setting comprises changes to a Domain Name System (DNS) server setting, static Internet Protocol (IP) address setting, and a Transmission Control Protocol (TCP)/IP setting; and
propagating the first change to one or more other virtual computing environments executing on the computer system from a central location resulting in a savings in resources.

17. The non-transitory computer-readable storage medium of claim 16, wherein the virtual computing environment and the one or more other virtual computing environments comprise at least one of:
a guest operating system;
a hypervisor; and
a host operating system.

18. The non-transitory computer-readable storage medium of claim 16, the method further comprising:
resolving a conflict between the first change and a second change in the setting from a second virtual computing environment from the one or more other virtual computing environments.

19. The non-transitory computer-readable storage medium of claim 18, wherein the conflict is resolved based on at least one of:
a set of priorities associated with the first and second virtual computing environments;
an order associated with the first and second changes; and
a policy associated with the first and second virtual computing environments.

20. The non-transitory computer-readable storage medium of claim 16, wherein propagating the first change to the one or more other virtual computing environments involves:
converting the first change into a canonical form; and
providing the canonical form to the one or more other virtual computing environments.

* * * * *